(12) United States Patent
Lu

(10) Patent No.: US 8,025,135 B1
(45) Date of Patent: *Sep. 27, 2011

(54) HYDRAULIC DAMPING DEVICE FOR DRAWER

(75) Inventor: Chun-Min Lu, Taipei Hsien (TW)

(73) Assignee: KV IP Holdings Ltd., George Town, Grand Cayman (KY)

( * ) Notice: Subject to any disclaimer, the term of this patent is extended or adjusted under 35 U.S.C. 154(b) by 1102 days.

This patent is subject to a terminal disclaimer.

(21) Appl. No.: 11/878,158

(22) Filed: Jul. 20, 2007

Related U.S. Application Data

(63) Continuation-in-part of application No. 11/812,246, filed on Jun. 15, 2007.

(51) Int. Cl.
*F16F 13/00* (2006.01)
(52) U.S. Cl. .............. 188/282.6; 188/282.5; 188/322.15
(58) Field of Classification Search ................... 188/266, 188/280, 283, 282.5, 282.6, 322.13, 322.14, 188/322.15, 322.17; 92/172, 181 R, 181 P, 92/183
See application file for complete search history.

(56) References Cited

U.S. PATENT DOCUMENTS

| | | | |
|---|---|---|---|
| 2,953,810 A * | 9/1960 | Hall | 16/52 |
| 2,953,811 A * | 9/1960 | Hall | 16/66 |
| 3,844,389 A | 10/1974 | De Carbon | |
| 3,937,450 A * | 2/1976 | Bauer | 267/113 |
| 4,030,715 A * | 6/1977 | Duran | 267/64.11 |
| 4,110,868 A * | 9/1978 | Imazaike | 16/84 |
| 4,113,071 A * | 9/1978 | Muller et al. | 188/282.8 |
| 4,310,148 A * | 1/1982 | Freitag | 267/124 |
| 4,467,899 A | 8/1984 | Molders et al. | |
| 4,503,951 A * | 3/1985 | Imaizumi | 188/280 |
| 4,510,752 A | 4/1985 | Gaiser | |
| 4,736,824 A | 4/1988 | Dony et al. | |
| 4,796,871 A * | 1/1989 | Bauer et al. | 267/64.11 |
| 4,817,238 A * | 4/1989 | Liu | 16/66 |
| 4,830,152 A * | 5/1989 | Rauert et al. | 188/322.15 |
| 5,259,294 A | 11/1993 | May | |
| 5,579,874 A * | 12/1996 | Jeffries et al. | 188/282.9 |
| 5,855,258 A | 1/1999 | Deferme | |
| 6,247,563 B1 | 6/2001 | De Carbon et al. | |
| 7,628,257 B1 * | 12/2009 | Lu | 188/282.6 |
| 2003/0132072 A1 | 7/2003 | Sawai et al. | |

FOREIGN PATENT DOCUMENTS

GB 2122305 A * 1/1984
JP 2005-16691 A 1/2005

* cited by examiner

*Primary Examiner* — Robert Siconolfi
*Assistant Examiner* — Mariano Sy
(74) *Attorney, Agent, or Firm* — Cook Alex Ltd.

(57) ABSTRACT

A hydraulic damping device for drawer includes a cylinder holding a hydraulic fluid, a piston rod moving in and out of the cylinder and having a pin at one end inside the cylinder, a rigid valve block affixed to the inner end of the pin of the piston rod and having equiangularly spaced through holes, a retainer affixed to the outer end of the pin of the piston rod, a piston coupled to the pin of the piston rod and movable along the pin between the rigid valve block and the retainer and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston and a plurality of spring strips for stopping against the rigid valve block, and a shock absorbing device that buffers the impact of the rigid valve block when the piston rod is extended out of the cylinder.

17 Claims, 9 Drawing Sheets

HYDRAULIC DAMPING DEVICE FOR DRAWER

CROSS-REFERENCE OF RELATED APPLICATION

The present invention is a continuation-in-part of HYDRAULIC DAMPING DEVICE FOR DRAWER of U.S. patent application Ser. No. 11/812,246, filed on 15 Jun., 2007.

BACKGROUND AND SUMMARY OF THE INVENTION

The present invention relates to damping devices and more particularly, to a hydraulic damping device for drawer, which buffers the reciprocating motion of the piston rod, allowing the piston rod to be moved out of the cylinder rapidly without much resistance and received in the inside of the cylinder slowly with much resistance. A shock-absorbing device is provided to buffer the impact when the piston rod is extended out of the cylinder.

U.S. Pat. No. 6,615,450B2 discloses an apparatus for the damping of impacts, preferably the impacts of furniture doors or drawers. According to this design, a compression spring is used to impart a damping resistance to the furniture drawer as the piston rod is moved to the inside of the cylinder. When the piston rod is extending out of the cylinder, the tube-section-like part of the compression spring is compressed to absorb shocks, lowering the noise level. However, because the compression spring has a certain length, it may cause an unsmooth movement of the piston rod.

The present invention has been accomplished under the circumstances in view. It is one object of the present invention to provide a hydraulic damper for drawer, which imparts a high damping resistance to the piston rod as the piston rod is moved toward the inside of the cylinder, smoothening the return stroke of the piston rod. It is another object of the present invention to provide a hydraulic damper for drawer, which allows the piston rod to be extended out of the cylinder at a high speed without much resistance and, which uses a shock absorbing device to absorb shocks and to buffer the impact when the piston rod is extended out of the cylinder, thereby lowering the noise level.

To achieve these and other objects of the present invention, the hydraulic damper comprises a cylinder holding a hydraulic fluid, a piston rod moving in and out of the cylinder and having a pin at one end inside the cylinder, a rigid valve block affixed to the inner end of the pin of the piston rod and having equiangularly spaced through holes, a retainer affixed to the outer end of the pin of the piston rod, a piston coupled to the pin of the piston rod and movable along the pin between the rigid valve block and the retainer and having a plurality of axially extending through holes, a number of the through holes of the piston being respectively aimed at the through holes of the rigid valve block for allowing the hydraulic fluid to pass through the piston in one direction at a high speed during outward stroke of the piston rod and to pass through the piston in the other direction at a low speed during inward stroke of the piston, and a shock absorber that buffers the impact of the rigid valve block when the piston rod is extended out of the cylinder.

Further, the piston has a plurality of spring strips. When the resisting force received by the piston is smaller than the spring power of the spring strips during return stroke of the piston, the spring strips immediately return to their former shape to suspend the raised portions thereof out of the rear side of the piston and to keep the piston apart from the rigid valve block for enabling the piston rod to be further extended out of the cylinder at a high speed with less resistance.

DETAILED DESCRIPTION OF THE INVENTION

Figure 1:
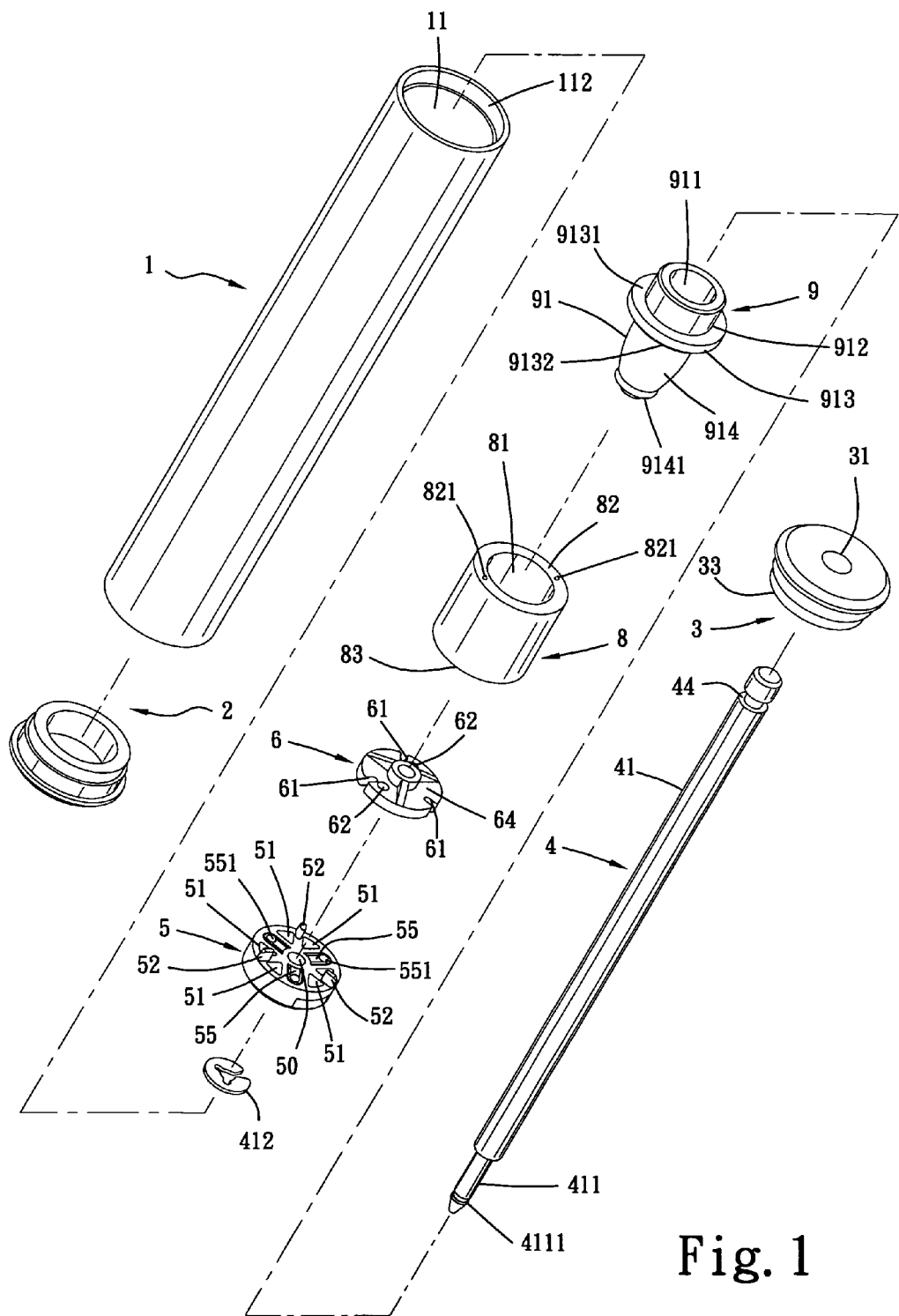
FIG. 1 is an exploded view of a hydraulic damper for drawer according to the present invention.
Figure 2:
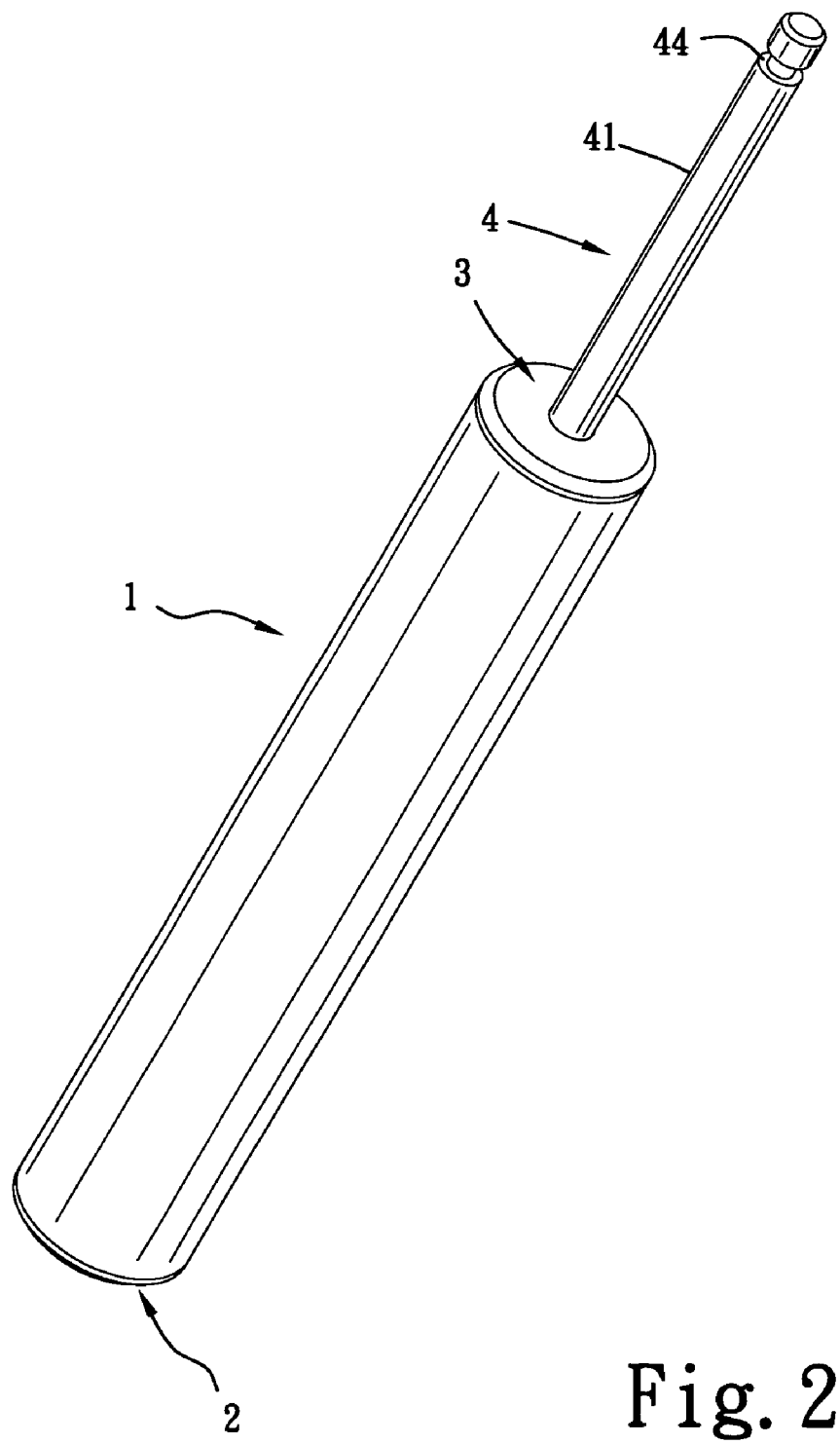
FIG. 2 is an elevational assembly view of the hydraulic damper for drawer according to the present invention.

Referring to FIGS. 1-9, a hydraulic damper for drawer in accordance with the present invention is shown comprised of a cylinder 1, a front cap 2, a rear cap 3, a piston rod 4, a piston 5, and a rigid valve block 6.

The cylinder 1 has a cylindrical peripheral wall 11 in which the piston 5 is moved with the piston rod 4 forwards/backwards, a front opening 111 defined in one end of the cylindrical peripheral wall 11 (see FIG. 7), and a rear opening 112 defined in the other end of the cylindrical peripheral wall 11.

Figure 3:
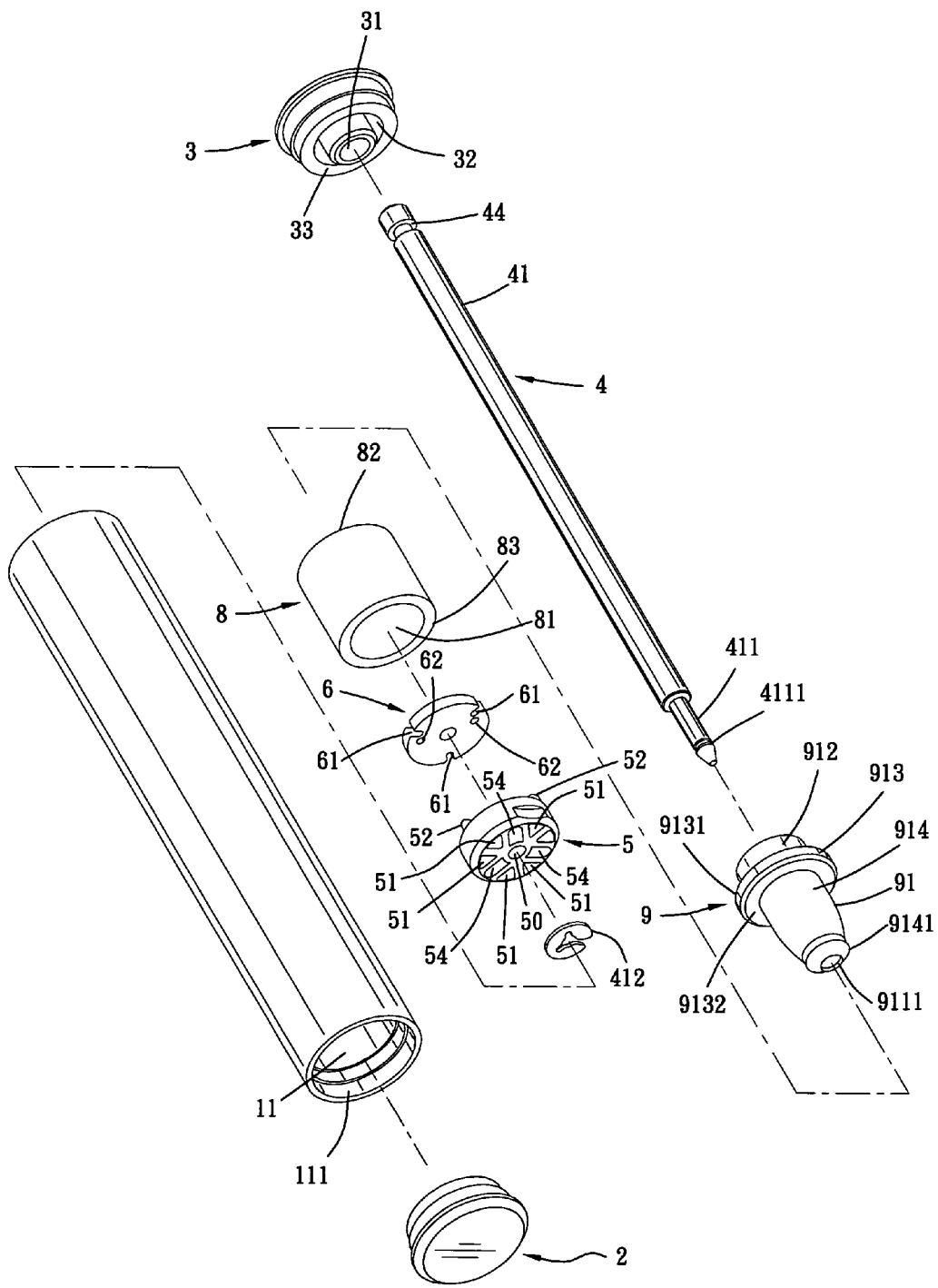
FIG. 3 corresponds to FIG. 1 when viewed from another angle.
Figure 4:
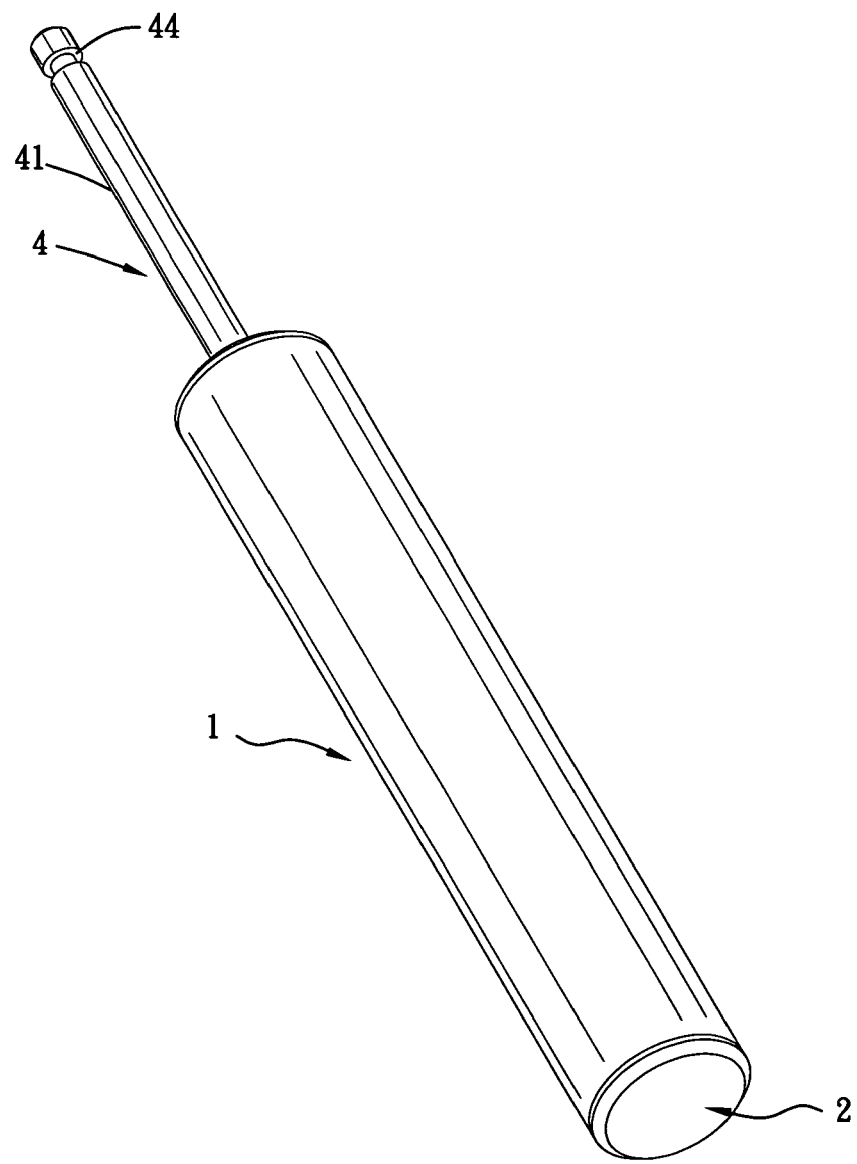
FIG. 4 corresponds to FIG. 2 when viewed from another angle.
Figure 7:
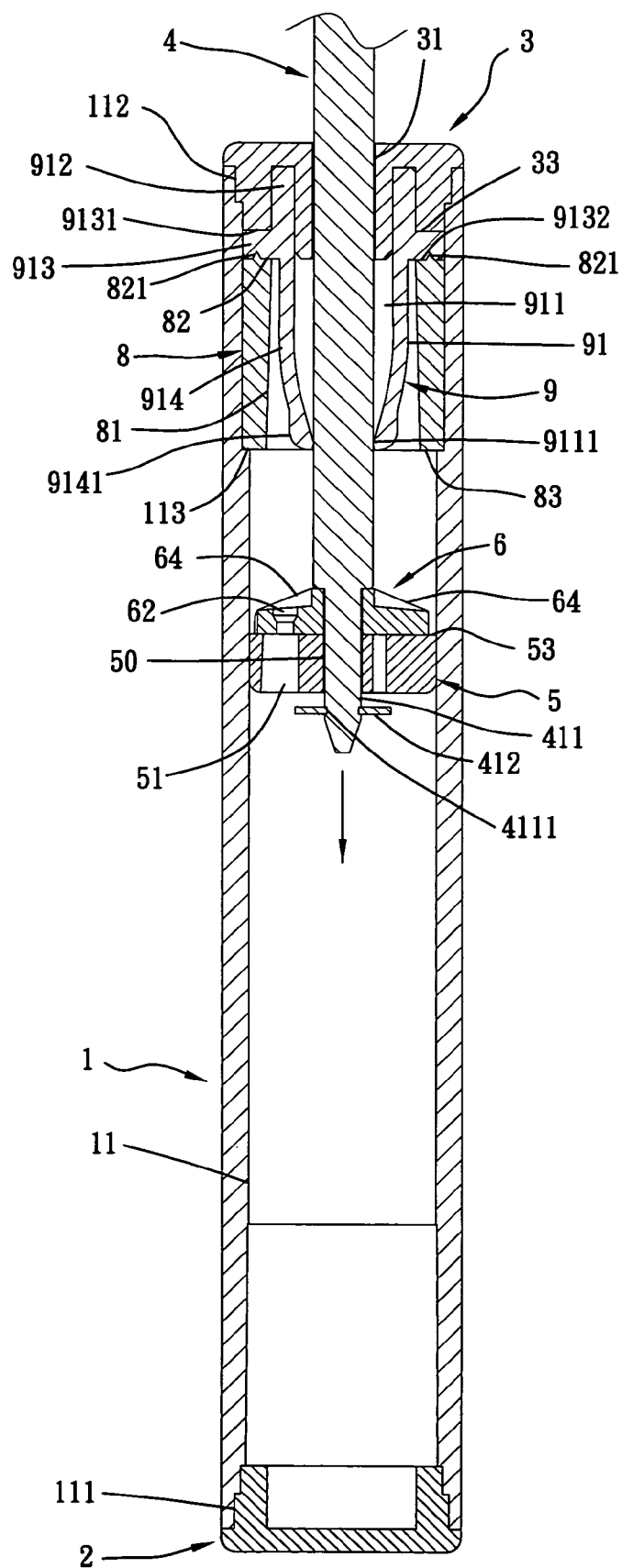
FIG. 7 is a sectional view of the present invention, showing the piston abutted against the rigid valve block.
Figure 8:
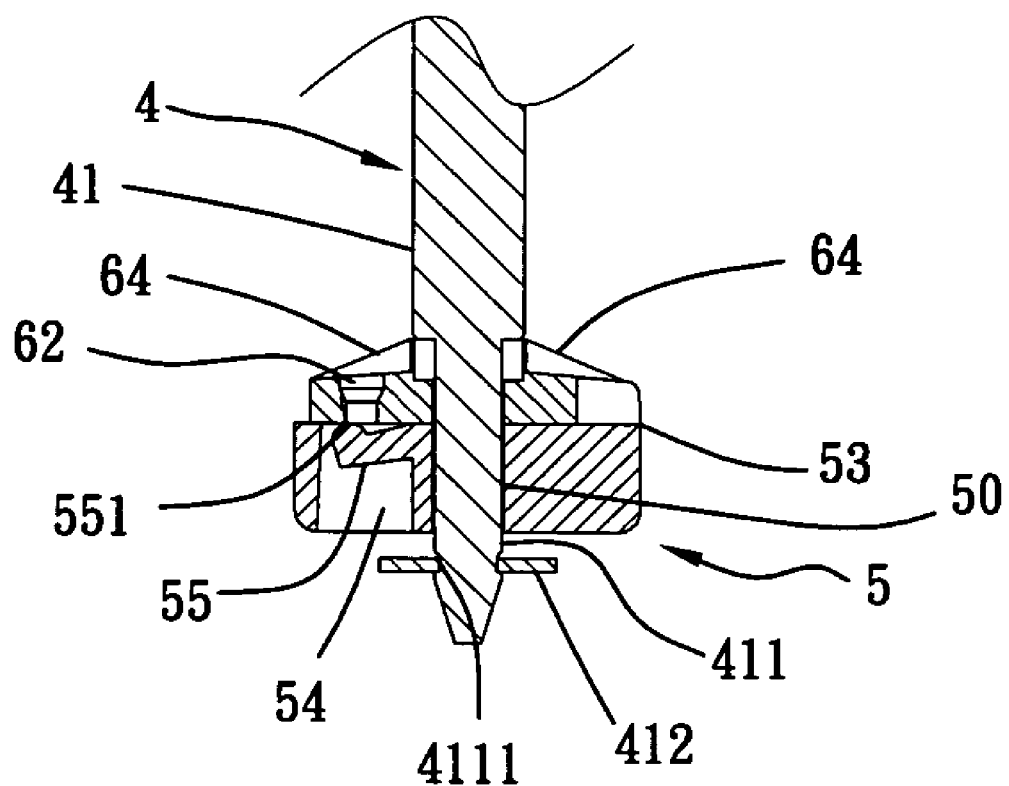
FIG. 8 is a sectional view of a part of the present invention, showing the piston abutted against the rigid valve block.
Figure 9:
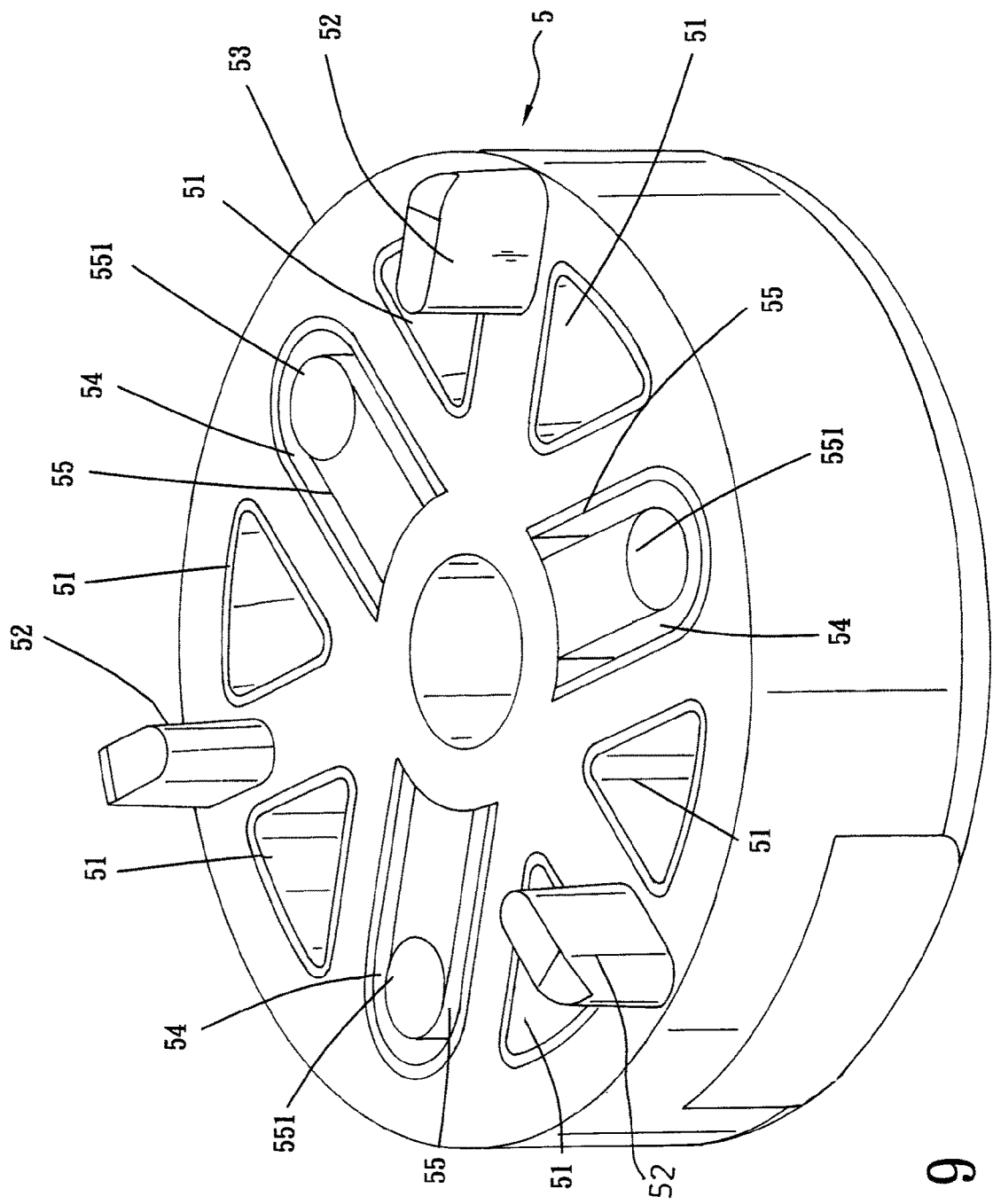
FIG. 9 is an elevational view in an enlarged scale of the piston of the hydraulic damper for drawer according to the present invention.

The front cap 2 is sealed to the cylindrical peripheral wall 11 of the cylinder 1 by, for example, an ultrasonic sealing process to close the front opening 111 after filling of a hydraulic fluid in the cylinder 1 (see FIGS. 3 and 7).

The rear cap 3 is sealed to the cylindrical peripheral wall 11 of the cylinder 1 by, for example, an ultrasonic sealing process to close the rear opening 112, having a center axle hole 31 for the passing of the piston rod 4 and an annular locating groove 32 extending around the center axle hole 31. The rear cap 3 is sealed to the cylinder 1 before filling of a hydraulic fluid (not shown) into the cylinder 1. After filling of the hydraulic fluid into the cylinder 1, the front cap 2 is sealed to the cylinder 1 to seal the hydraulic fluid in the cylinder 1.

The piston rod 4 has a rod body 41 inserted through the center axle hole 31 of the rear cap 3, and a pin 411 axially extending from one end, namely, the front end of the rod body 41 for the mounting of the rigid valve block 6 and the piston 5. The pin 411 has an annular locating groove 4111 extending around the periphery near the distal (free) end remote from the rod body 41. Further, a retainer 412 is fastened to the annular locating groove 4111 to secure the piston 5 to the pin 411.

The piston 5 is preferably molded from plastics, having an outer diameter slightly smaller than the inner diameter of the cylindrical peripheral wall 11 of the cylinder 1. Further, the piston 5 has a center pivot hole 50 coupled to the pin 411 of the piston rod 4 for allowing movement of the piston 5 along the pin 411 between the retainer 412 and the rigid valve block 6, a plurality of through holes 51 axially extending through the front and rear sides and equiangularly spaced around the center pivot hole 50, a plurality of guide rods 52 axially extending from the rear side, a plurality of slots 54 (see FIGS. 6 and 9) cut through the front and rear sides, and a plurality of spring strips 55 respectively suspending in the slots 54. The spring strips 55 each have a raised portion 551 protruded from the free end.

The rigid valve block 6 is fastened to the pin 411 of the piston rod 4 and stopped at the front end of the rod body 41, having an outer diameter smaller than the inner diameter of the cylindrical peripheral wall 11 of the cylinder 1. The rigid valve block 6 further has a plurality of axially extending guide grooves 61 that receive the guide rods 52 of the piston 5, and a plurality of through holes 62 axially extending through the front and rear sides (see FIGS. 1 and 6). The through holes 62 of the rigid valve block 6 are respectively aimed at some of the through holes 51 of the piston 5, i.e., the number of the through holes 62 of the rigid valve block 6 is less than the number of the through holes 51 of the piston 5.

When the piston rod 4 is extended out of the cylindrical peripheral wall 11 of the cylinder 1, the piston 5 is forced by the damping force of the hydraulic fluid in the cylinder 1 to move forwards along the pin 411 toward the retainer 412 and is then stopped at the retainer 412. At this time, the raised portions 551 of the spring strips 55 of the piston 5 are pressed on the rigid valve block 6, leaving a gap between the rigid valve block 6 and the rear side 53 of the piston 5 (see FIG. 5). At the same time, the hydraulic fluid flows through the through holes 62 of the rigid valve block 6 and the gap between the rigid valve block 6 and the inside wall of the cylindrical peripheral wall 11 of the cylinder 1 and then the through holes 51 of the piston 5 toward the front side (end) of the cylinder 1, and therefore the piston rod 4 with the piston 5 and the rigid valve block 6 move backwards at a high speed without much resistance. When the piston rod 4 is moved toward the inside of the cylindrical peripheral wall 11 of the cylinder 1, the piston 5 bears the pressure of the hydraulic fluid and is forced to stop at the front side of the rigid valve block 6, and at the same time the raised portions 551 of the spring strips 55 of the piston 5 are forced inwards toward the inside of the associating slots 54 (see FIG. 8), and therefore the piston rod 4 with the piston 5 and the rigid valve block 6 receive much resistance and move toward the inside of the cylinder 1 at a low speed, i.e., the buffering effect is produced to lower the return stroke of the piston rod 4 and the piston 5. When the piston rod 4 is received in the cylinder 1 and the spring power of the spring strips 55 of the piston 5 surpasses the resisting force at the piston 5, the spring strips 55 immediately return to their former shape, and therefore the raised portions 551 of the spring strips 55 are kept suspending out of the rear side 53 of the piston 5, leaving a gap between the rigid valve block 6 and the rear side 53 of the piston 5 (see FIGS. 5 and 6). Therefore, the piston rod 4 with the piston 5 and the rigid valve block 6 can be moved backwards at a high speed without much resistance, i.e., the piston rod 4 can be extended out of the cylinder 1 at a high speed and received inside the cylinder 1 at a low speed. In an application example of the present invention, the cylinder 1 is affixed to the outer sliding rail of a sliding track assembly at one side of a sliding box in a furniture (not shown) and the rear end 44 of the piston rod 4 is coupled to the inner sliding rail of the sliding track assembly. When the user opens the sliding box, the piston rod 4 is moved with the sliding track assembly toward the outside of the furniture at a high speed without much resistance. On the contrary, when the user pushes the sliding box backwards toward the inside of the furniture, the piston rod 4 receives much damping resistance from the hydraulic fluid that acts upon the piston 5 and the rigid valve block 6, buffering the backward motion of the sliding box.

Further, the rigid valve block 6 has its rear side 64 beveled (or shaped like a cone) to reduce resistance during its backward movement with the piston rod 4. Further, the through holes 62 of the rigid valve block 6 have a diameter gradually increasing in direction from the front side of the rigid valve block 6 toward the rear side of the rigid valve block 6. Therefore, the hydraulic fluid receives less resistance when it flows through the through holes 62 of the rigid valve block 6 in direction from the front side of the rigid valve block 6 toward the rear side of the rigid valve block 6; the hydraulic fluid receives much resistance when it flows through the through holes 62 of the rigid valve block 6 in direction from the rear side of the rigid valve block 6 toward the front side of the rigid valve block 6.

The hydraulic damper further comprises a shock-absorbing device. The shock-absorbing device is comprised of a holder member 8, and a compressible shock-absorbing member 9.

The shock-absorbing member 9 is made out of rubber, having a hollow body 91 and an axial through hole 911 extending through the front and rear sides of the cylindrical body 91 for the passing of the piston rod 4. The hollow body 91 has a rear big diameter section 912, a front small diameter section 914, an annular flange 913 extending around the periphery between the rear big diameter section 912 and the front small diameter section 914. The front small diameter section 914 has a diameter gradually reducing in direction from the rear big diameter section 912 toward the front side and terminating in a front holding down rim 9141. After insertion of the piston rod 4 through the axial through hole 911, the inner surface 9111 of the front holding down rim 9141 is firmly pressed on the periphery of the piston rod 4 due to the effect of the elastic material property of the shock-absorbing member 9, and the rear big diameter section 912 is fitted into the annular locating groove 32 of the rear cap 3 with the rear side 9131 of the annular flange 913 stopped against the front edge 33 of the rear cap 3 (see FIGS. 3 and 5). Because the front holding down rim 9141 is firmly pressed on the periphery of the piston rod 4, the shock-absorbing member 9 prohibits hydraulic fluid from flowing through the axial through hole 911 of the shock-absorbing member 9.

Figure 5:
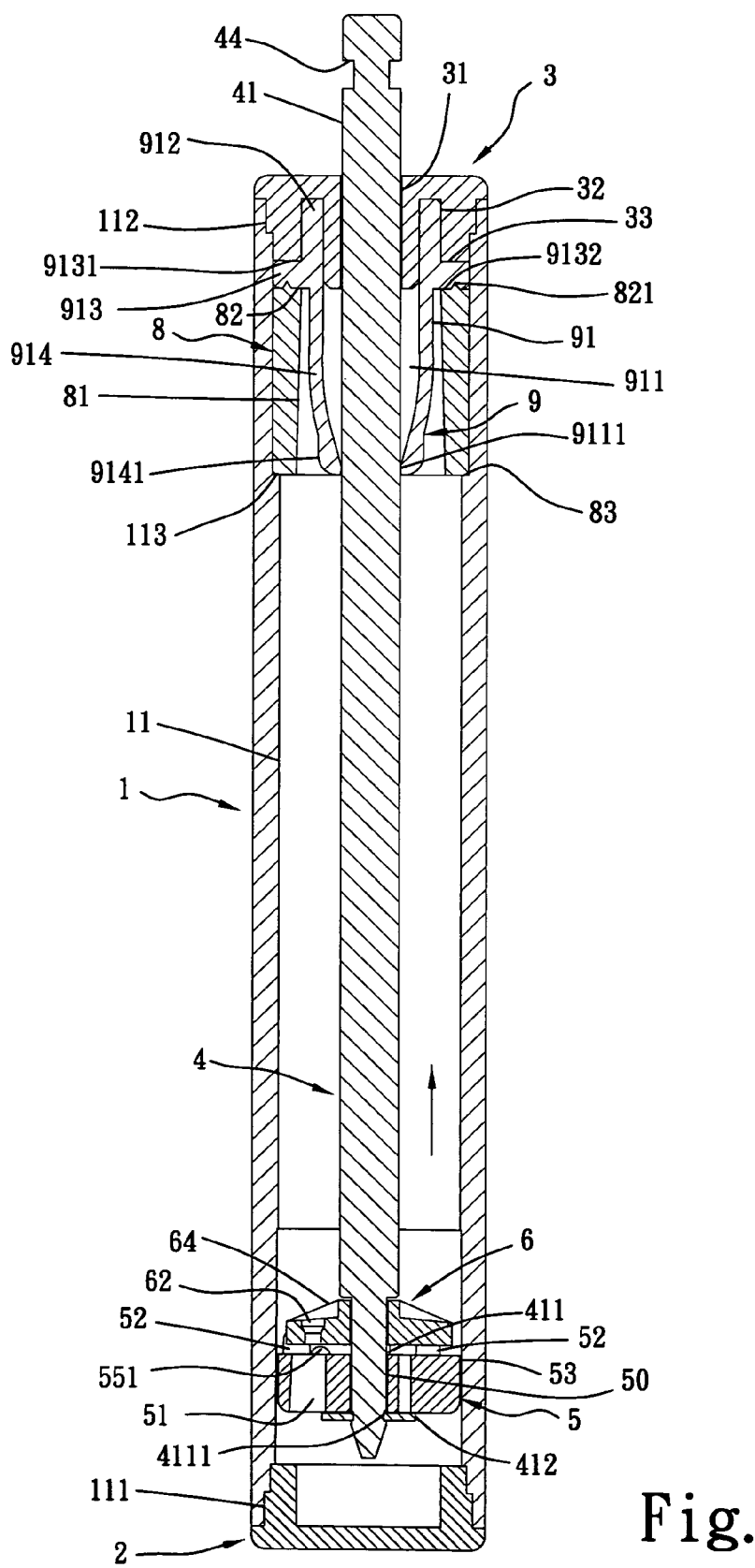
FIG. 5 is a sectional view of the present invention, showing the piston kept apart from the rigid valve block.
Figure 6:
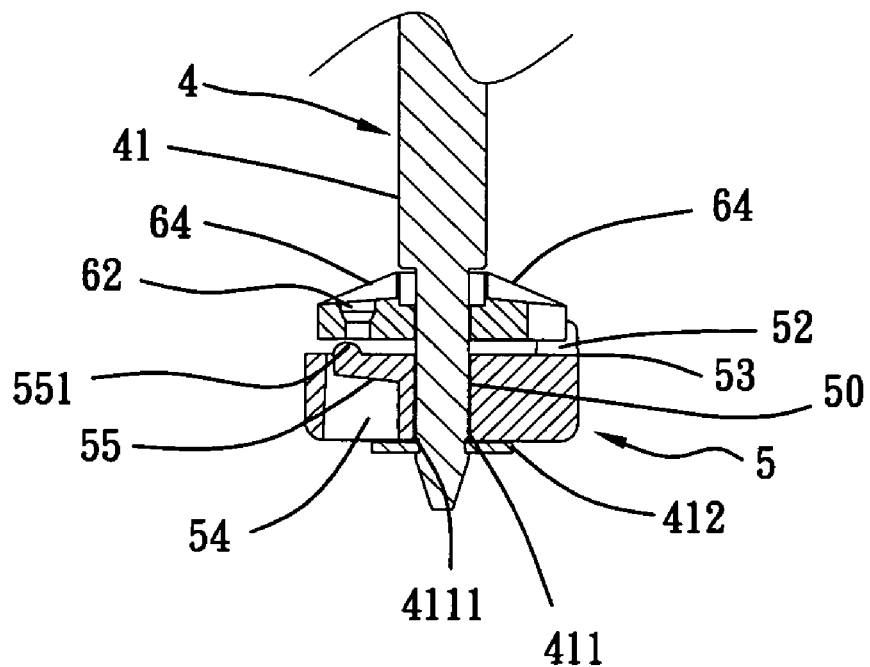
FIG. 6 is a sectional view of a part of the present invention, showing the piston kept apart from the rigid valve block.

The holder member 8 is a barrel-like member having a tapered axial through hole 81, which receives the front small diameter section 914 of the shock-absorbing member 9, a rear end edge 82 stopped against the front side 9132 of the annular flange 913, a plurality of pointed protrusions 821 protruded from the rear end edge 82 and engaged into the front side 9132 of the annular flange 913, and a front end edge 83 stopped against a step 113 inside the cylindrical peripheral wall 11 of the cylinder 1 (see FIGS. 1 and 5). The tapered axial through hole 81 gradually reduces from the front side toward the rear side. After the front small diameter section 914 of the shock-absorbing member 9 is received in the tapered axial through hole 81 of the holder member 8, a gap is left between the outer diameter of the front small diameter section 914 of the shock-absorbing member 9 and the inner diameter of the holder member 8 (see FIG. 5) to facilitate backward compression of the front small diameter section 914 of the shock-absorbing member 9.

When the piston rod 4 is extending out of the cylindrical peripheral wall 11 of the cylinder 4 at a high speed, the rigid valve block 6 will be moved with the piston rod 4 to compress the shock-absorbing member 9, achieving the desired shock-absorbing effect and lowering the noise level.

As stated above, the invention provides a hydraulic damper for drawer that has the following features and advantages:

1. A high damping resistance is given to the piston rod 4 when the piston rod 4 is moved inwards toward the inside of the cylinder 1, smoothening the inward movement of the piston rod 4.

2. The piston rod 4 receives less resistance when it is moved out of the cylinder 1, and therefore the piston rod 4 can be extended out of the cylinder 1 at a high speed. Further, the shock-absorbing device buffers the impact to lower the noise level when the piston rod 4 is extended out of the cylinder 1 at a high speed.

3. The piston 5 has a plurality of spring strips 55. When the resisting force received by the piston 5 is smaller than the spring power of the spring strips 55 during return stroke of the piston 5, the spring strips 55 immediately return to their former shape to suspend the raised portions 551 out of the rear side of the piston 5 and to keep the piston 5 apart from the rigid valve block 6 for enabling the piston rod 4 to be further extended out of the cylinder 1 at a high speed with less resistance.

What is claimed is:

1. A hydraulic damping device for drawer comprising:
   a cylinder having a front opening in a front end thereof and a rear opening in a rear end thereof;
   a front cap sealed to the front opening of said cylinder;
   a rear cap sealed to the rear opening of said cylinder, said rear cap having a center axle hole;
   a hydraulic fluid filled in said cylinder;
   a piston rod having a rod body inserted through the center axle hole of said rear cap and extending out of said cylinder, a pin axially extending from one end of said rod body and suspending inside said cylinder, and a retainer connected to said pin remote from said rod body;
   a rigid valve block coupled to said pin and stopped against said rod body of said piston rod, said rigid valve block having a diameter smaller than the inner diameter of said cylinder and a plurality of through holes axially extending through front and rear sides thereof; and
   a piston connected to said pin and being axially movable along said pin between said retainer and said rigid valve block, said piston having an outer diameter smaller than the inner diameter of said cylinder, a plurality of through holes and slots axially extending through front and rear sides thereof, at least one spring strip extending into at least one of said slots, said at least one spring strip having a raised portion extending out of said piston toward said rigid valve block.

2. The hydraulic damping device for drawer as claimed in claim 1, wherein said pin of said piston rod has an annular locating groove extending around the periphery thereof that engages said retainer.

3. The hydraulic damping device for drawer as claimed in claim 1, wherein said piston has a plurality of guide rods perpendicularly extending from the rear side, and said rigid valve block has a plurality of guide grooves for receiving the guide rods of said piston.

4. The hydraulic damping device for drawer as claimed in claim 1, wherein the number of the through holes of said piston is greater that the number of the through holes of said rigid valve block, and at least one of the through holes of said piston is aimed at least one of the through holes of said rigid valve block.

5. The hydraulic damping device for drawer as claimed in claim 1, wherein the rear side of said rigid valve block has a conical shape.

6. The hydraulic damping device for drawer as claimed in claim 1, wherein the rear side of said rigid valve block is beveled.

7. The hydraulic damping device for drawer as claimed in claim 1, further comprising a shock absorbing device disposed adjacent said rear cap inside said cylinder and being adapted to engage said rigid valve block when said piston rod is moved outward relative to said cylinder.

8. The hydraulic damping device for drawer as claimed in claim 7, wherein said shock-absorbing device further comprises a shock-absorbing member constructed of rubber.

9. The hydraulic damping device for drawer as claimed in claim 8, wherein said shock-absorbing member has a cylindrical body and an axial through hole extends through front and rear sides of the cylindrical body and receives said piston rod.

10. The hydraulic damping device for drawer as claimed in claim 9, wherein said rear side of the cylindrical body engages said rear cap.

11. The hydraulic damping device for drawer as claimed in claim 10, wherein the cylindrical body of said shock-absorbing member includes a rear big diameter section, a front small diameter section, and an annular flange extending around the periphery thereof between said rear big diameter section and said front small diameter section.

12. The hydraulic damping device for drawer as claimed in claim 11, wherein the rear of the cylindrical body of said shock-absorbing member is fitted into said rear cap.

13. The hydraulic damping device for drawer as claimed in claim 11, wherein said rear cap has an annular groove in a front side thereof for receiving the rear big diameter section of said shock-absorbing member.

14. The hydraulic damping device for drawer as claimed in claim 12, wherein said front small diameter section has a diameter gradually reducing in direction from said rear big diameter section toward a front side of the cylindrical body and terminating in a front holding down rim that engages said piston rod.

15. The hydraulic damping device for drawer as claimed in claim 14, wherein said cylinder of the hydraulic damping device has an inside annular step.

16. The hydraulic damping device for drawer as claimed in claim 15, wherein said shock absorber further comprises a holder member having a tapered axial through hole, which receives the front small diameter section of said shock-absorbing member, a rear end edge that engages the annular flange of said shock-absorbing member, and a front end edge that engages said inside annular step in said cylinder.

17. The hydraulic damping device for drawer as claimed in claim 16, wherein said rear end edge of said holder member has a plurality of pointed protrusions that engage a front side of the annular flange of said shock-absorbing member.

* * * * *